United States Patent [19]
Collins et al.

[11] Patent Number: 5,891,950
[45] Date of Patent: Apr. 6, 1999

[54] USE OF STABLE AMINO-FUNCTIONAL LATEXES IN WATER-BASED INKS

[75] Inventors: Martha Jean Collins, Blountville; Glen Dennis Shields, Kingsport; Rebecca Reid Stockl, Kingsport; James Wayne Taylor, Kingsport, all of Tenn.

[73] Assignee: Eastman Chemical Company, Kingsport, Tenn.

[21] Appl. No.: 861,436

[22] Filed: May 21, 1997

Related U.S. Application Data

[60] Provisional application No. 60/018,423, May 28, 1996 and provisional application No. 60/018,424, May 28, 1996 and provisional application No. 60/023,922, Aug. 14, 1996 and provisional application No. 60/028,444, Oct. 10, 1996.

[51] Int. Cl.$^6$ .................................................. C08K 3/04
[52] U.S. Cl. ........................................................ 524/502
[58] Field of Search ............................................. 524/502

[56] References Cited

U.S. PATENT DOCUMENTS

| | | | |
|---|---|---|---|
| 3,113,038 | 12/1963 | Lattarulo et al. | 117/140 |
| 3,261,797 | 7/1966 | McDowell et al. | 260/29.6 |
| 3,290,417 | 12/1966 | Christenson et al. | 260/901 |
| 3,325,443 | 6/1967 | Christenson et al. | 260/41 |
| 3,356,627 | 12/1967 | Scott | 260/29.6 |
| 3,386,939 | 6/1968 | Mesee et al. | 260/29.3 |
| 3,483,149 | 12/1969 | Gresenz et al. | 260/18 |
| 3,553,116 | 1/1971 | Kaplan et al. | 260/17 |
| 3,607,834 | 9/1971 | Marx et al. | 260/63 R |
| 3,639,327 | 2/1972 | Drelich | 260/29.6 NR |
| 3,678,013 | 7/1972 | Sherwood et al. | 260/77.5 R |
| 3,679,564 | 7/1972 | Dowbenko et al. | 204/181 |
| 3,725,124 | 4/1973 | Gorton et al. | 117/138.8 UA |
| 3,927,206 | 12/1975 | Blank et al. | 424/81 |
| 4,136,067 | 1/1979 | Reed et al. | 521/32 |
| 4,158,725 | 6/1979 | Nishimura et al. | 526/52.1 |
| 4,210,565 | 7/1980 | Emmons et al. | 260/29.6 TA |
| 4,239,893 | 12/1980 | Pigerol et al. | 546/321 |
| 4,241,682 | 12/1980 | Kondstandt | 114/67 R |
| 4,244,850 | 1/1981 | Mylonakis | 260/29.6 M |
| 4,535,128 | 8/1985 | Umemoto et al. | 525/162 |
| 4,812,541 | 3/1989 | Mallya et al. | 526/264 |
| 4,820,863 | 4/1989 | Taylor | 560/115 |
| 4,855,349 | 8/1989 | Ingle | 524/432 |
| 4,906,684 | 3/1990 | Say | 524/548 |
| 4,908,229 | 3/1990 | Kissel | 427/54.1 |
| 4,908,403 | 3/1990 | Spada et al. | 524/818 |
| 4,987,186 | 1/1991 | Akiyama et al. | 525/107 |
| 5,002,998 | 3/1991 | Carey et al. | 524/555 |
| 5,021,469 | 6/1991 | Langerbeins et al. | 523/201 |
| 5,053,441 | 10/1991 | Biale | 523/201 |
| 5,055,506 | 10/1991 | Knutson | 524/100 |
| 5,073,445 | 12/1991 | Ingle | 428/314.4 |
| 5,100,969 | 3/1992 | Yamamoto et al. | 525/327.3 |
| 5,108,575 | 4/1992 | Chung et al. | 204/181.7 |
| 5,185,397 | 2/1993 | Biale | 524/820 |
| 5,202,375 | 4/1993 | Biale | 524/562 |
| 5,227,413 | 7/1993 | Mitra | 523/116 |
| 5,242,978 | 9/1993 | Muller et al. | 525/102 |
| 5,244,963 | 9/1993 | Biale | 524/555 |
| 5,246,984 | 9/1993 | Darwen et al. | 523/404 |
| 5,247,040 | 9/1993 | Amick et al. | 526/286 |

(List continued on next page.)

FOREIGN PATENT DOCUMENTS

| | | |
|---|---|---|
| 341886 | 11/1989 | European Pat. Off. . |
| 358358 | 3/1990 | European Pat. Off. . |
| 390370 | 10/1990 | European Pat. Off. . |
| 483915 | 5/1992 | European Pat. Off. . |
| 0 552 469 A2 | 7/1993 | European Pat. Off. . |
| 555774 | 8/1993 | European Pat. Off. . |
| 705855 | 4/1996 | European Pat. Off. . |
| 2535372 | 2/1977 | Germany . |
| 3713511 | 12/1987 | Germany . |
| 49-92163 | 9/1974 | Japan ................................. 524/502 |
| 61-21171 | 1/1986 | Japan . |
| 1-229242 | 9/1989 | Japan . |
| 3-6236 | 1/1991 | Japan . |
| 4-189874 | 7/1992 | Japan . |
| 1151479 | 5/1969 | United Kingdom . |
| WO 91/14715 | 10/1991 | WIPO . |
| WO 95/00573 | 1/1995 | WIPO . |
| WO95/09209 | 4/1995 | WIPO . |
| WO 96/16998 | 6/1996 | WIPO . |
| WO 96/32424 A2 | 10/1996 | WIPO . |

OTHER PUBLICATIONS

Geurink et al, "Analytical aspects and film properties of two-pack acetoacetate functional laxtexes," *Progress in Organic Coatings*, vol. 27, Jan.–Apr. 1996, pp. 73–78.

D. Horn, "Polyethylenimine–Physicochemical Properties and Applications" 1980.

Nishihata et al., "Formation and Hydrolysis of Enamine in Aqueous Solution" Chem. Pharm. Bull., Jan. 26, 1984.

Rector et al., "Applications for the Acetoacetyl Functionality in Thermoset Coatings" Feb. 3, 1988.

Lee et al., "Effects of Surfactants and Polymerization Methods On The Morphology of Particles Formed in 'Core–Shell' Emulsion Polymerization of Methyl Methacrylate and Styrene" Makromol. Chem., SEp. 8, 1989.

"For Your Unlimited Imagination: Polymin (Polyethylenimine)" 1992 BASF Corporation.

Moszner et al. "Reaction behaviour of monomeric β–ketoesters" Polymer Bulletin, 1994.

Keith M. Moody, "Waterborne Acrylic Emulsion Using AAEM" Technical Tips, Eastman Kodak Company Sep. 1, 1995.

Derwent Abstract of JP3020302, Jan. 29, 1991.
Derwent Abstract of JP60127376, Jul. 8, 1995.

*Primary Examiner*—Bernard Lipman
*Assistant Examiner*—N. Sarofim
*Attorney, Agent, or Firm*—Rose M. Allen; Harry J. Gwinnell

[57] ABSTRACT

A water-based ink composition is described. The ink composition contains a pigment and a polymer latex. The polymer latex may be a polymeric (polyamino) enamine latex or a mixture of a polymeric (polyamino) enamine latex and an acetoacetoxy-functional polymer latex. The inks are particularly useful as laminating and surface-printing inks. Methods of printing are also described.

22 Claims, No Drawings

U.S. PATENT DOCUMENTS

| | | | |
|---|---|---|---|
| 5,270,380 | 12/1993 | Adamson et al. | 524/556 |
| 5,277,978 | 1/1994 | Feustel et al. | 428/402 |
| 5,296,530 | 3/1994 | Bors et al. | 524/558 |
| 5,308,890 | 5/1994 | Snyder | 523/201 |
| 5,344,675 | 9/1994 | Snyder | 427/388.4 |
| 5,349,026 | 9/1994 | Emmons et al. | 525/328.6 |
| 5,362,816 | 11/1994 | Snyder et al. | 525/329.9 |
| 5,364,891 | 11/1994 | Pears et al. | 522/149 |
| 5,371,148 | 12/1994 | Taylor et al. | 525/293 |
| 5,391,624 | 2/1995 | Rasoul et al. | 525/216 |
| 5,414,041 | 5/1995 | Larson et al. | 524/589 |
| 5,426,129 | 6/1995 | Emmons et al. | 522/6 |
| 5,484,849 | 1/1996 | Bors et al. | 525/167.5 |
| 5,494,961 | 2/1996 | Lavoie et al. | 525/102 |
| 5,494,975 | 2/1996 | Lavoie et al. | 525/928.6 |
| 5,498,659 | 3/1996 | Esser | 524/549 |
| 5,525,662 | 6/1996 | Lavoie et al. | 524/558 |
| 5,534,310 | 7/1996 | Rokowski et al. | 427/494 |
| 5,541,251 | 7/1996 | Bontinck et al. | 524/507 |
| 5,548,024 | 8/1996 | Lavoie et al. | 525/102 |
| 5,559,192 | 9/1996 | Bors et al. | 525/300 |
| 5,562,953 | 10/1996 | Bors et al. | 427/558 |
| 5,605,722 | 2/1997 | Esser | 427/388.4 |
| 5,605,952 | 2/1997 | Esser | 524/522 |
| 5,605,953 | 2/1997 | Esser | 524/522 |
| 5,609,965 | 3/1997 | Esser | 428/522 |
| 5,616,764 | 4/1997 | Lavoie et al. | 556/482 |
| 5,672,379 | 9/1997 | Schall et al. | 427/137 |
| 5,763,546 | 6/1998 | Jung et al. | 525/313 |
| 5,767,199 | 6/1998 | Bors et al. | 525/153 |

USE OF STABLE AMINO-FUNCTIONAL LATEXES IN WATER-BASED INKS

This is a non-provisional application of provisional applications 60/018,413 filed May 28, 1996, 60/018,424 filed May 28, 1996, 60/023,922 filed Aug. 14, 1996 and 60/028,444 filed Oct. 10, 1996.

FIELD OF THE INVENTION

This invention relates to a novel application for the use of amino-functional polymer latexes and of acetoacetoxy-functional polymer latexes in water-based printing inks. The invention particularly relates to inks printed on flexible film packaging material, especially laminating inks.

BACKGROUND

Surface printing and lamination printing are two examples of printing processes used to print on substrates such as film, or flexible packaging material, which may include foils and metalized films. Printing on those substrates with such processes places certain requirements on the ink composition used. Inks used in surface printing are printed to the front side of the film. The ink must print well, adhere to the substrate, have good water resistance, rub resistance, squalene resistance, and other performance properties consistent with an ink that may experience normal everyday direct handling.

Extrusion lamination and adhesive lamination are two types of lamination printing processes often used with flexible packaging material. Inks used in such processes are generally printed to the reverse side of a substrate. The inked substrate is then laminated to a second barrier substrate with either molten polyethylene extrudate (extrusion lamination) or with a water-based, solvent-based or solventless adhesive (adhesive lamination). The inks must print well and must not detract from the lamination bond strength. The inks must also possess sufficient flexibility, heat, water, solvent and rub resistance to withstand the lamination process and maintain laminate structure after application.

A typical water-based ink, such as a surface printing ink, extrusion lamination ink, and adhesive lamination ink composition contains water dispersible polymers, one or more pigments, water-miscible solvents, and additives such as wetting agents, leveling agents, rheology additives, additives to promote resolubility/rewet on the press, coalescing aids, pigment wetting agents, dispersing agents, surfactants, waxes, defoaming agents and antifoaming agents.

These inks are applied by typical application methods, such as the flexographic and gravure methods common to the ink industry. The inks are printed on multi-color printing presses, thermally dried, and then converted into packaging materials. After printing, a surface printed substrate is re-wound, then shipped to the packaging convertor for production. The extrusion or adhesive lamination process is often done "in-line." The typical "in-line", extrusion lamination method uses molten low density polyethylene (LDPE) as the extrudate. The ink is reverse printed to the first substrate, typically a non rigid film, such as oriented polypropylene (OPP), polyethylene, polyester, polyamide, etc. This printed substrate passes through a drying oven to dry and cure the ink. The ink is then primed with a dilute solution of adhesion promoting polyethyleneiminie or polyurethane. The primed ink is laminated to the second substrate by pressing it in a two roll nip while injecting molten polyethylene at the nip opening. Following lamination, the ink must maintain adhesion to the first substrate, must have cohesive strength and must adhere to the polyethylene extrudate.

An "off-line" extrusion lamination process is similar to the "in-line" process except the substrate is rewound after the ink is cured and dried. The inked substrate is transported to a laminator, unwound, primed with either polyethyleneimine or polyurethane, and then laminated to a second substrate with molten polyethylene in a two roll nip. The ink must maintain adhesion to the first substrate, must maintain cohesive strength, must adhere to the polyethylene extrudate, must not block on the roll, and must have sufficient resistance properties so as not be damaged during transport to the laminator. Typical properties needed to withstand transporting are: water resistance, dry and wet rub resistance and adhesion.

The "in-line" and "off-line" adhesive lamination processes are similar to their respective extrusion processes except the inked substrate is laminated to the second substrate with a solvent-based, water-based, or solventless adhesive. The adhesive is typically applied over the ink immediately prior to lamination. The ink must have sufficient resistance to the adhesive so that ink does not lift from the substrate nor lose properties due to attack by the adhesive. The ink must maintain adhesion to the first substrate, must adhere to the adhesive, must have cohesive strength following lamination, must not lose performance when an adhesive is applied to the ink, and must have sufficient water resistance, non-blocking, and rub resistance properties to allow re-winding and transportation to an laminator for "off-line" lamination.

A surface printing process is also similar to an "off-line" lamination printing process, except that it does not include a laminating step. The substrate is rewound after the ink is cured and dried. The ink must maintain adhesion, not block on the roll, and have sufficient resistance properties so as not to be damaged during further processing into and use as a finished good.

SUMMARY OF THE INVENTION

This invention relates to ink compositions containing polymer latexes such as amino-functional polymer latexes and acetoacetoxy-functional polymer latexes. The invention provides a water-based ink composition, which is particularly suited for use as a laminating ink and as a surface printing ink. The water-based ink composition contains a pigment and a polymer latex selected from a polymeric (polyamino) enamine (PPAE) latex and a mixture of a polymeric (polyamino) enamine latex and an acetoacetoxy-functional polymer latex. The PPAE is the reaction product of a surfactant-stabilized acetoacetoxy-functional polymer (SAAP) and a poly(alkylenimine). More particularly, the polymer latexes are water-based latexes having dispersed, waterborne amino-functional PPAE polymer particles; dispersed, waterborne acetoacetoxy-functional polymer particles; or mixtures thereof. In a preferred embodiment, the water-based ink composition contains a pigment, dispersed waterborne PPAE particles, and water. In another embodiment, the ink comprises a pigment, a mixture of dispersed waterborne PPAE particles and dispersed waterborne acetoacetoxy-functional polymer particles, and water.

DETAILED DESCRIPTION OF THE INVENTION

This invention relates to ink compositions containing polymer latexes such as amino-functional polymer latexes and acetoacetoxy-functional polymer latexes. The water-based inks of the invention maybe used to print on flexible film packaging material. An ink composition of the invention contains a pigment, preferably a pre-dispersed commercial pigment dispersion; and a polymer latex selected from a polymeric (polyamino) enamine (PPAE) latex and a mixture of a polymeric (polyamino) enamine latex and an acetoacetoxy-functional polymer latex. The polymer, on a solids basis, is preferably present in the ink composition in an amount ranging from about 40–80 weight percent. More preferably, the polymer is present in an amount ranging from 55–75 weight percent. As is known in the art, the amount of pigment varies with the type of ink and the type of pigment. Any ink pigment known in the art may be used in an ink composition of the invention. On a solid basis, the pigment may, for example, be present in an amount ranging from about 5–50 weight percent, preferably 30–40 weight percent. Water may be added as needed to adjust the ink to a viscosity capable of printing, for example, by either flexographic or gravure methods.

Inks according to this invention have been shown to print successfully to the flexible substrates typically used by the packaging industry (e.g. oriented polypropylene (OPP), polyethylene, polyester, polyamide, etc). These inks can be formulated to achieve excellent adhesion, water resistance, solvent resistance, dry and wet rub resistance, ice water crinkle resistance and block resistance. This combination of properties on the difficult to wet and adhere to flexible film packaging substrates is unique.

Advantageously, ink compositions of the invention offer outstanding bond strength when applied and/or laminated. The ink compositions give bond strengths up to and in excess of 500 g/in. In contrast, commercial water-based inks typically yield bond strengths in the range of 150 g/in. Commercial water-based inks, however, generally require a polyethyleneimine or polyurethane primer to achieve that bond strength. Unprimed, a typical commercial water-based ink will give a bond strength of less than 5 g/in.

Another unique feature of the inks of the invention is their ability to develop solvent resistance by crosslinking of the ink's polymer latex, particularly inks containing mixtures of the PPAE and acetoacetoxy-functional polymer latexes. A crosslinked latex is more resistant to attack from the solvent-based adhesives used in the adhesive lamination market. The typical commercial water-based polymers are non-crosslinking and do not offer this benefit.

Ink compositions of the invention may also contain common ink additives depending on need of a particular ink or printing method. Such ink additives include, but are not limited to: wetting agents, leveling agents, rheology additives, additives to promote resolubility/rewet on the press, coalescing aids, pigment wetting agents, dispersing agents, surfactants, waxes, defoaming agents, antifoaming agents, and modifying polymers.

For example, to develop rheology and press resolubility/rewet, the inks of the invention can be formulated with low molecular weight amine soluble resins, such as, but not limited to, styrenated acrylic resins (e.g., Joncryl 678 resin, available from SC Johnson & Sons), and styrenated maleic anhydride resins, (e.g., Arco 1440H resin, available from Arco Chemical Company). Other additives, such as slow evaporating solvents (e.g., glycerine, and propylene glycol), slow evaporating amines (e.g., monoethanolamine and dimethylethanol amine), urea and other soluble salts can also enhance the press rewet/resolubility properties of these inks. Typical use levels for these additives are: 5–40 weight percent for the low molecular weight amine soluble resins; 0.5 to 10.0 weight percent for the slow evaporating solvents and amines; and 0.5 to 10.0 weight percent for urea and other soluble salts.

As mentioned above, an ink composition according to the invention may also contain modifying polymers or latexes commonly used in inks. Exemplary modifying polymers and latexes include, but are not limited to, Joncryl 2630 resin (a styrenated acrylic emulsion available from SC Johnson & Sons), Lucidene 605 resin (a styrenated acrylic resin available from Morton Chemical), or polyvinyl alcohol. Modifying polymers such as these are employed to impart properties to the ink or as diluents.

As discussed, an ink composition of the invention may also contain a water-miscible solvent such as an alcohol or glycol ether. Isopropyl alcohol and propyl alcohol are water-miscible solvents commonly used in ink compositions and which may be added in the same manner to an ink composition according to the invention.

A buffer, preferably an ammonium-based buffer, may also be included in an ink composition of the invention. The pH of a water-based ink composition of the invention may be adjusted and/or buffered using, for example, sodium bicarbonate, ammonium bicarbonate, ammonium dihydrogenphosphate, an ammonium salt of a polyacrylic acid, or a mixture of such buffers. The buffering compound, such as ammonium bicarbonate, may be added to either the polymer latex prior to formulating the ink composition or during formulation. Inks having pH values in the range of about 9 to 10 are preferred.

The ink compositions of this invention offer: 1) excellent performance properties for surface printing, extrusion lamination and adhesive lamination end uses; 2) an outstanding combination of surface printing performance properties including, but not limited to, excellent adhesion, water resistance, solvent resistance, dry and wet rub resistance, ice water crinkle resistance and block resistance; 3) an outstanding combination of extrusion lamination performance properties including, but not limited to, excellent lamination bond strength with or without the use of a primer, excellent adhesion, water resistance, solvent resistance, dry and wet rub resistance, ice water crinkle resistance and block resistance; and 4) an outstanding combination of adhesive lamination performance properties including, but not limited to, excellent lamination bond strength with generally-used water-based, solvent-based and solventless adhesives, excellent adhesion, water resistance, solvent resistance, dry and wet rub resistance, ice water crinkle resistance and block resistance.

The ink compositions of the invention are particularly useful as lamination inks and surface printing inks. A preferred water-based ink composition of the invention, which has the advantages just discussed, contains a pigment and a polymeric (polyamino) enamine (PPAE) latex. Another preferred ink composition contains a pigment and a mixture of a polymeric (polyamino) enamine (PPAE) latex and an acetoacetoxy-functional polymer latex. More preferably, a buffer is also incorporated into these ink compositions.

The following discussion describes, in more detail, the polymer latexes used in the ink compositions of the invention. In the polymer latexes, the polymers generally exist as particles dispersed in water. The particles may be structured or unstructured. Structured particles include, but are not limited to, core/shell particles and gradient particles. For use in an ink composition of the invention, the particle size of the polymers may range from about 30 to about 500 nm. Preferred particle sizes range from about 50 to about 150 nm. The polymer particles generally have a spherical shape. In a preferred embodiment, the generally spherical polymeric particle has a core portion and a shell portion. The core/shell polymer particles may also be prepared, for example, in a multilobe form, a peanut shell, an acorn form, or a raspberry form. It is further preferred in such core/shell particles that the core portion comprises about 20% to about 80% of the total weight of the particle and the shell portion comprises about 80% to about 20% of the total weight volume of the particle.

Polymeric (polyamino)enamines represent a particularly preferred group of polymers for use in a water-based ink composition according to the invention. A polymeric (polyamino)enamine (PPAE) results from the reaction of a surfactant-containing acetoacetoxy.-functional polymer (SAAP) with a poly(alkylenimine). Mixtures of PPAE's, where different poly(alkylenamines) are reacted with a SAAP may also be used.

The SAAP may be prepared by free radical emulsion polymerization of non-acid vinyl monomer having an acetoacetoxy functionality such as those of Formula (1) below with at least one non-self-polymerizing, surface-active vinyl monomer and other non-acid vinyl monomers. This affords water-based dispersion of surfactant-containing polymer particles with the polymer having pendant acetoacetoxy groups. As used here, a non-acid vinyl monomer is an ethylenically-unsaturated, non-carboxylic acid-containing monomer. A pendant acetoacetoxy group is not strictly limited to those at the termini of the polymer. Pendant acetoacetoxy groups also include groups attached to the polymer's backbone and available for further reaction.

The SCRAP preferably contains about 1 to about 40 weight percent acetoacetoxy-functional monomers such as those of Formula (1) below, about 0.05 to about 20 weight percent of at least one non-self-polymerizing, surface-active vinyl monomer and about 60 to about 90 weight percent of other non-acid vinyl monomers. The weight percentage is based on the total amount of monomer. More preferably, the SAAP has about 10 to about 25 weight percent acetoacetoxy monomers, about 0.1 to about 5 weight percent of at least one non-self-polymerizing, surface-active vinyl monomer and about 75 to about 90 weight percent of other vinyl monomers.

The water-based emulsion polymerization to prepare the SAAP preferably occurs in the presence of a nonionic surfactant and an anionic surfactant. The nonionic surfactant may be present in amounts ranging from about 0.25 to about 5 phr, and the anionic surfactant in amounts ranging from about 0.1 to 1 phr. The unit "phr" defines the grams dry weight of the recited component, for example the surfactant, per 100 grams dry weight of the resin, where the "resin" includes all polymerization components excluding water. Aspects of this emulsion polymerization and preferred embodiments are discussed below.

Any non-acid vinyl monomer having acetoacetoxy-type functionality may be used to prepare a polymer of the invention. Of such monomers, preferred monomers are those of Formula (1).

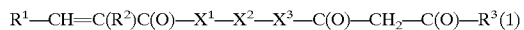

For an acetoacetoxy-type monomer of Formula (1), $R^1$ is a hydrogen or halogen. $R^2$ is a hydrogen, halogen, $C_1$–$C_6$ alkylthio group, or $C_1$–$C_6$ alkyl group. $R^3$ is a $C_1$–$C_6$ alkyl group. $X^1$ and $X^3$ are independently O, S, or a group of the formula —N(R')—, where R' is a $C_1$–$C_6$ alkyl group. $X^2$ is a $C_2$–$C_{12}$ alkylene group or $C_3$–$C_{12}$ cycloalkylene group. The alkyl and alkylene groups described here and throughout the specification may be straight or branched groups.

Preferred monomers of Formula (1) are acetoacetoxyethyl methacrylate, acetoacetoxyethyl acrylate, acetoacetoxy (methyl)ethyl acrylate, acetoacetoxypropyl acrylate, allyl acetoacetate, acetoacetamidoethyl (meth)acrylate, and acetoacetoxybutyl acrylate. Acetoacetoxyethyl methacrylate (AAEM) represents a particularly preferred monomer of Formula (1).

Suitable non-acid vinyl monomers which may be used, for example, include, but are not limited to, methyl acrylate; methyl methacrylate; ethyl acrylate; ethyl methacrylate; butyl acrylate; butyl methacrylate; isobutyl acrylate; isobutyl methacrylate; ethylhexyl acrylate; 2-ethylhexyl methacrylate; octyl acrylate; octyl methacrylate; iso-octyl acrylate; iso-octyl methacrylate; trimethylolpropyl triacrylate; styrene; α-methyl styrene; glycidyl methacrylate; carbodiimide methacrylate; $C_1$–$C_{18}$ alkyl crotonates; di-n-butyl maleate; di-octylmaleate; allyl methacrylate; di-allyl maleate; di-allylmalonate; methoxybutenyl methacrylate; isobornyl methacrylate; hydroxybutenyl methacrylate; hydroxyethyl (meth)acrylate; hydroxypropyl (meth) acrylate; acrylonitrile, vinyl chloride; ethylene; vinyl ethylene carbonate; epoxy butene; 3,4-dihydroxybutene; hydroxyethyl (meth)acrylate; methacrylamide; acrylamide; butyl acrylamide; ethyl acrylamide; vinyl (meth)acrylate; isopropenyl (meth)acrylate; cycloaliphaticepoxy (meth) acrylates; and ethylformamide. Such monomers are described in "The Brandon Worldwide Monomer Reference Guide and Sourcebook" Second Edition, 1992, Brandon Associates, Merrimack, N.H.; and in "Polymers and Monomers", the 1996–1997 Catalog from Polyscience, Inc., Warrington, Pa.

To increase polymer stability, a small amount (about 0.4 phr) of sodium 2-acrylamido-2-methylpropane sulfonate, (AMPS), and other stabilizing monomers may be incorporated into the SAAP. Adding such stabilizing monomers to the polymer shall aid in preventing flocculation upon the addition of a polyalkylenimine to form a PPAE. High levels of such stabilizing monomers may create water membrane layers between polymer particles in the latex or disrupt film formation. AMPS is available from the Lubrizol Corporation under the LUBRIZOL 2405 tradename.

Vinyl esters of the general Formula (2) represent further examples of non-acid vinyl monomers:

In Formula (2), R is independently hydrogen or an alkyl group of up to 12 carbon atoms. Particular monomers of Formula (2) include $CH_2$=CH—O—C(O)—$CH_3$, $CH_2$=CH—O—C(O)—C($CH_3$)$_3$, $CH_2$=CH—O—C(O)—CH($C_2H_5$)($C_4H_9$), and $CH_2$=CH—O—C(O)—$CH_2CH_3$. Vinyl ester monomers also include vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

Small amounts of acid vinyl monomers may also be used to prepare an SAAP. Such acid vinyl monomers include, for example, acrylic acid, methacrylic acid, itaconic acid, crotonic acid, and monovinyl adipate. Incorporating acid vinyl monomers into the SAAP may increase the viscosity of the resulting latex and may have a detrimental effect on the formation of an enamine-functional polymer according to the invention. Generally these monomers are used in small amounts. Preferably, the amount of acid vinyl monomers may range, for example, from 0 to 5 phr. Greater amounts may be used to achieve a desired effect, such as increased viscosity.

Preparation of the SAAP reacts non-acid vinyl monomers, such as described above, with at least one non-self-polymerizable, surface-active vinyl monomer (also known as a non-self-polymerizable ethylenically-unsaturated surfactant or a reactive surfactant). A non-self-polymerizable surfactant monomer, rather than polymerizing with itself to form a separate polymeric surfactant, is substantially (preferably completely) incorporated into the polymer of the invention. Thus, the surfactant becomes part of the polymer. Non-self-polymerizing surfactants possessing, for example, propenylphenyl or allyl groups are preferred. Examples include surface active monomers sold by PPG Industries, Inc., as MAZON® SAM 181, 183, 184, 211 surfactants which are anionic sulfates or sulfonates and MAZON® SAM 185–187 surfactants which are nonionic surfactants. Other non-self-polymerizing, surface-active vinyl monomers include the macro monomers sold by Daiichi Kogyo Seiyaku under the names NIOGEN RN, AQUARON or HITENOL surfactants. These include polyoxyethylene alkyl phenyl ether compounds of the general formulae (3), (4), and (5):

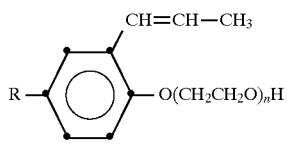

(3)

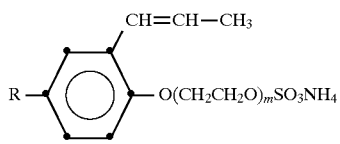

(4)

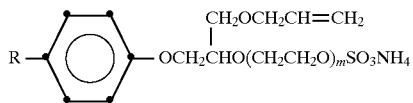

(5)

In Formulae (3), (4), and (5), R is nonyl or octyl and n and m are preferably integers of from 15 to 50 and 15 to 40, respectively. More preferably, n ranges from 20 to 40, and m from 15 to 25. HITENOL RN, HITENOL HS-20 and HITENOL A-10 products are particularly preferred non-self-polymerizing, surface-active monomers. Other such polymerizable surfactants include the sodium alkyl allyl sulfosuccinate sold by Henkel, under the trade name TREM LF-40 surfactant.

The SAAP (as well as other polymers useful in ink compositions of the invention) may be prepared using emulsion polymerization techniques known in the art. The polymer may, as is known in the art, be prepared using free radical emulsion polymerization techniques which yield structured or unstructured particles. As mentioned above, structured particles include, for example, core/shell particles, raspberry particles, and gradient particles. Chain transfer agents, initiators, reducing agents, buffers, and catalysts, known in the art of emulsion polymerization, may be used to prepare the polymers.

Exemplary chain transfer agents are butyl mercaptan, dodecyl mercaptan mercaptopropionic acid, 2-ethylhexyl 3-mercaptopropionate, n-butyl 3-mercaptopropionate, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate, and the reactive chain transfer agents taught in U.S. Pat. No. 5,247,040, incorporated here by reference. In particular, 2-ethylhexyl 3-mercaptopropionate represents a preferred chain transfer agent.

Typical initiators include hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Polymerization catalysts are those compounds which increase the rate of polymerization and which, in combination with the above described reducing agents, may promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

As discussed above, the emulsion polymerization to prepare the SAAP preferably occurs in water and in the presence of a nonionic surfactant and/or an anionic surfactant. Suitable nonionic surfactants include surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, and triisopropyl phenol. Preferred nonionic surfactants are the TERGITOL 15-S-40 and TERGITOL NP-40 surfactants available from Union Carbide. TERGITOL 15-S-40 surfactant (CAS #68131-40-8) is a reaction product of a mixture of 11–15 carbon, linear secondary alcohols and ethylene oxide. TERGITOL NP-40 surfactant is the reaction product of a nonylphenol and about 40 moles of ethylene oxide. Another preferred nonionic surfactant is SURFONYL 485 surfactant available from Air Products.

Anionic surfactants which may be used in the polymer latexes include surfactants such as alkali metal or ammonium salts of alkyl, aryl or alkylaryl sulfonates, sulfates, phosphates, and the like. These anionic surfactants include, for example, sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like. AEROSOL 18 surfactant, a 35% solution of N-octyldecyl sulfosuccinimate in water and AEROSOL OT-75 surfactant, a 75% solution of sodium dioctyl sulfosuccinate in water, from Cytec are preferred anionic surfactants.

Water-dispersible and water-soluble polymers may also be employed as surfactants/stabilizers in the polymer latexes used in the ink compositions of the invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413. Cellulosics and polyvinyl alcohol may also be used.

To form a PPAE, a SAAP is reacted with a poly (alkylenimine). In general, a poly(alkylenimine) contains primary, secondary, and tertiary amine groups. Primary and secondary amine groups of the poly(alkylenimine) react with the pendant acetoacetoxy groups on the SAAP to form enamine linkages yielding a polymeric (polyamino)enamine or PPAE.

A poly(alkylenimine) for use in the invention may have a weight average molecular weight of about 400 to about 750,000. The poly(alkylenimine) is preferably a poly (ethyleneimine) (PEI) and more preferably PEI having a weight average molecular weight of about 800 to about 25,000. The PEI contains primary, secondary, and tertiary amine groups. Such PEI compounds are commercially available from many sources and include POLYMIN poly (ethylenimine) and LUPASOL poly(ethylenimine) available from BASF Corporation. BASF polyethylenimine product literature reports the ratio of primary:secondary:tertiary amine groups to be about 1:2:1. A preferred PEI, LUPASOL G35 poly(ethylenimine), has a molecular weight of 2,000 and a ratio of primary:secondary:tertiary amine groups of about 1.5:1.4:1.

The reaction to form the PPAE may be accomplished by adding, with stirring, the appropriate poly(alkylenimine) to an emulsion of the SAAP. Sufficient poly(alkylenimine) should be used to achieve a molar ratio of NH groups to acetoacetoxy groups of about 1 to about 8 and preferably a molar ratio from about 2 to about 5. The amount of poly (alkylenimine) added to the polymer having pendant acetoacetoxy groups may range from about 5 phr (grams dry weight poly(alkylenimine) to 100 grams dry weight resin) to about 30 phr and preferably from about 8 phr to about 25 phr. Water-based emulsions of the polymers may be combined over about 15–30 minutes at ambient temperature. When preparing the PPAE in a direct process, the reaction mixture containing the polymer having pendant acetoacetoxy groups may need to be cooled before adding the poly(alkylenimine).

As mentioned above, another preferred ink composition of the invention employs, as its polymer latex, a mixture of a PPAE latex and an acetoacetoxy-functional polymer latex. Any vinyl polymer having pendant acetoacetoxy groups or their derivatives may be used as the acetoacetoxy-functional polymer latex in a water-based ink composition of the invention. Polymers having pendant acetoacetoxy groups have been described, for example, in U.S. Pat. No. 4,987, 186; U.S. Pat. No. 4,908,403; European Patent Application No. 0 573 142 A1; European patent Application No. 0 483 915 A1; and in Del Rector, et al., "Applications for the Acetoacetoxy Functionality in Thermoset Coatings", presented at the Water-Borne and Higher Solids Coatings Symposium, Feb. 3–5, 1988, New Orleans, La. These documents are incorporated here by reference.

The polymers having pendant acetoacetoxy groups or derivatives of acetoacetoxy groups may be prepared using emulsion polymerization techniques known in the art, such as described above. Generally, the acetoacetoxy-functional polymer is prepared by emulsion polymerization of acetoacetoxy monomers such as Formula I above with other vinyl monomers. These polymers may contain both acid- and non-acid vinyl monomers. See U.S. Pat. No. 4,987,186; U.S. Pat. No. 4,908,403; European Patent Application No. 0 573 142 A1; European patent Application No. 0 483 915 A1; and Del Rector, et al., supra. Preferred acetoacetoxy-functional monomers and non-acid vinyl monomers are the same as those discussed above in regards to the SAAP. The acetoacetoxy-functional polymer need not incorporate a non-self-polymerizing, surface-active vinyl monomer, but in a preferred embodiment may be the SAAP used to prepare the PPAE. More preferably, the emulsion polymerization used to prepare the acetoacetoxy-functional polymer is carried out in the presence of a nonionic surfactant and an anionic surfactant as described above for the SAAP.

The acetoacetoxy-functional polymer should contain sufficient acetoacetoxy-functionality, to allow it to undergo crosslinking and, in a preferred embodiment, to react and crosslink with the PPAE. The acetoacetoxy-functional polymer may, for example, generally contain from about 1 weight percent to about 40 weight percent of acetoacetoxy-functional monomers and about 60 to about 99 weight percent of other vinyl monomers. The amount of acetoacetoxy-functional monomers may vary outside this range depending on the degree of cure necessary for a particular application. The acetoacetoxy-functional polymer may be a high or low molecular weight polymer with an average molecular weight ranging, for example, from about 1000 to over 1 million. Lower molecular weight polymers should contain more acetoacetoxy-functional monomers to assure sufficient crosslinking with the amino-functional polymer upon film formation and cure.

The acetoacetoxy functionality in the acetoacetoxy-functional polymer may be present as free acetoacetoxy groups or as derivatives of those groups such as, for example, an enamine group or acetoacetamide group. The acetoacetoxy-functional polymer may contain both free acetoacetoxy groups and acetoacetoxy derivatives. When the acetoacetoxy-functional polymers contains acetoacetoxy derivatives, the polymer should be capable of crosslinking with the amino-functional polymer upon film formation. This crosslinking may occur through acetoacetoxy groups or the derivative groups.

Enamine-functional polymers represent a preferred derivative of polymers having pendant acetoacetoxy groups. Enamine-functional polymers may be used as the acetoacetoxy-functional polymer in a water-based ink composition of the invention. In water-based latexes, the enamine functionality serves to stabilize the acetoacetoxy-groups and protect them from hydrolysis. Enamine-functional polymers have been described in Moszner et al., Polymer Bulletin 32, 419–426 (1994); European Patent Application No. 0 492 10 847 A2; U.S. Pat. No. 5,296.530; and U.S. Pat. No. 5,484,849. These documents are incorporated here by reference.

Enamine-functional polymers may be prepared by reacting a polymer having acetoacetoxy groups with ammonia, a primary amine, or secondary amine. This preparation of enamine-functional vinyl polymers having pendant enamine groups is described in U.S. Pat. No. 5,484,849. Typically, the reaction stoichiometry uses at least one molar equivalent of amino (NH) groups to acetoacetoxy groups. Though the reaction is rapid, an equilibrium exists between the enamine product and the acetoacetoxy/NH reactants. The rate of enamine formation increases with temperature. Due to the equilibrium, however, an enamine-functional polymer may have both enamine and acetoacetoxy groups.

Enamine-functional polymers or copolymers may also be prepared by polymerization of enamine-functional monomers. This method of preparation is described Moszner et all., Polymer Bulletin 32, 419–426 (1994). Enamine-functional polymers also having allyl functionalities are described in U.S. patent application Ser. No. 08/420,550 which is incorporated here by reference. During emulsion polymerization, allyl functionality may be incorporated into the particles using, for example, allyl methacrylate and acetoacetoxy and/or enamine functionality may be incorporated using, for example, acetoacetoxy methacrylate.

In a preferred ink composition of the invention, the PPAE may be blended with an acetoacetoxy-functional polymer in a ratio ranging from 1:20 to 20:1. As known in the art, the ratio may vary depending upon the specified type of ink and substrate.

A preferred ink composition of the invention employs a polymer latex containing dispersed, waterborne PPAE particles; dispersed, waterborne acetoacetoxy-functional polymer particles; and a buffer, particularly an ammonium-based buffer. The pH of the latex may be adjusted and/or buffered using the buffers described above for the ink composition. Such buffers include, for example, sodium bicarbonate, ammonium bicarbonate, ammonium dihydrogenphosphate, an ammonium salt of a polyacrylic acid, or a mixture of such buffers. The buffering compound, such as ammonium bicarbonate, may be added to either the amino-functional polymer latex or the acetoacetoxy-functional polymer latex or a mixture thereof prior to formulating the ink composition. Preferably the buffer is added to a mixture of the polymer latexes.

When an ammonium buffer is used, an equilibrium exits between the ammonium ion and amine groups on the amino-functional polymer particles. This equilibrium provides free ammonia to the latex which may react with the acetoacetoxy groups on the acetoacetoxy-functional polymer to form enamine groups. Not only does this provide stability to the acetoacetoxy-functional polymer, but it also may lower and buffer the pH of the overall latex. Latexes having pH values in the range of about 8.4 to 9.2 may be achieved using ammonium buffers. Moreover, the buffered latexes of the invention possess increased stability (shelf life) at elevated temperatures and for long periods of time.

The following examples are intended to illustrate, not limit, the present invention. The examples of various coating compositions of the invention use the following:

LUPASOL G35 poly(ethylenimine), MW 2000, sold by BASF as a 50% solution in water.

Flexiverse Blue BHD-1121 product: A commercial C.I. Blue 15:3 colorant from Sun Chemical Corporation, Dispersions Division, Ameilia, Ohio.

Mobil 100 LBW oriented polypropylene(OPP) which had been corona-treated about four months prior to use from Mobil Corporation.

Eastman 1925 clear high slip polyethylene film, 1.25 mils thick, surface treated to 40–42 dynes/cm.

Amko white high slip polyethylene film from Amko Plastics. Surface treatment>42 dynes/cm as determined by accepted laboratory wetting tests.

Joncryl 2630 acrylic latex sold by SC Johnson Polymer.

LATEX EXAMPLE 1

The following procedure describes the preparation of small unstructured amine-containing waterborne particles.

To a 1000 mL resin kettle equipped with a condenser, nitrogen purge, and subsurface feed tube were added 290 g of water, 15.52 g of HITENOL HS-20, 2.55 g of TERGITOL NP-40(70%), 3.5 g of sodium carbonate, 5.20 g of styrene, 8.70 g of 2-ethylhexyl acrylate, and 4.40 g of acetoacetoxyethyl methacrylate. A nitrogen purge was begun, then the contents of the reactor brought up to 80° C. at 400 rpm. After reaching 80° C., an initiator charge composed of 2.30 g of sodium persulfate dissolved in 13.0 g of water was added to the reactor. An emulsion feed composed of 120 g of water, 6.55 g of AEROSOL 18, 10.22 g of TERGITOL NP-40 (70%), 98.63 g of styrene, 165.29 g of 2-ethylhexyl acrylate, and 76.18 g of acetoacetoxyethyl methacrylate was begun at 8.38 g/min. Five minutes after the first emulsion feed was begun, an initiator solution composed of 1.3 g of sodium persulfate dissolved in 33.5 g of water was fed at 0.536 g/min. Five minutes after the monomer feed, an initiator solution of 0.40 g of sodium persulfate, and 0.40 g of sodium metabisulfite dissolved in 12 g of water was charged and heating continued for 30 minutes. The emulsion was cooled, and 161.4 g of LUPASOL G35 polyethyenimine were pumped in over 15 minutes. The latex was then filtered through 100 mesh wire screen. Solids level, 44.7; amount of dried material (100 mesh screen), 0.93 g; particle size (Electron Micrograph), 75 nm.

LATEX EXAMPLE 2

The following procedure describes the preparation of small unstructured enamine-containing waterborne particles:

To a 1000 mL resin kettle equipped with a condenser, nitrogen purge, and subsurface feed tube were added 340 g of water, 15.52 g of HITENOL HS-20, 2.55 g of TERGITOL NP-40(70%), 3.5 g of sodium carbonate, 4.61 g of methyl methacrylate, 7.16 g styrene, 1.70 g of 2-ethylhexyl acrylate, and 4.43 g of acetoacetoxyethyl methacrylate. A nitrogen purge was begun, then the contents of the reactor brought up to 80° C. at 400 rpm. After reaching 80° C., an initiator charge composed of 2.3 g of sodium persulfate dissolved in 13.0 g of water was added to the reactor. An emulsion feed composed of 120 g of water, 6.55 g of AEROSOL 18, 10.2 g of TERGITOL NP-40 (70%), 87.54 g of methyl methacrylate, 136.04 g of styrene, 32.31 g of 2-ethylhexyl acrylate, and 84.20 g of acetoacetoxyethyl methacrylate was begun at 1.72 g/min. Five minutes after the first emulsion feed was begun, an initiator solution composed of 1.30 g sodium persulfate dissolved in 33.5 g of water was fed at 0.16 g/min. Five minutes after the monomer feed, an initiator solution of 0.4 g of sodium persulfate, and 0.4 g of sodium metabisulfite dissolved in 12 g of water was charged and heating continued for 30 minutes. The emulsion was cooled, and 27.66 g of ammonium hydroxide (28%) was pumped into the reactor. The latex was then filtered through 100 mesh wire screen. Solids level, 40.8; amount of dried material (100 mesh screen), 0.12 g.

LATEX EXAMPLE 3

The following procedure describes the preparation of small unstructured non-functional waterborne particles:

To a 1000 mL resin kettle equipped with a condenser, nitrogen purge, and subsurface feed tube were added 340 g of water, 15.52 g of HITENOL HS-20, 2.55 g of TERGITOL NP-40(70%), 3.5 g of sodium carbonate, 5.73 g of methyl methacrylate, 7.16 g styrene, and 5.01 g of 2-ethylhexyl acrylate. A nitrogen purge was begun, then the contents of the reactor brought up to 80° C. at 400 rpm. After reaching 80° C., an initiator charge composed of 2.3 g of sodium persulfate dissolved in 13.0 g of water was added to the reactor. An emulsion feed composed of 120 g of water, 6.55 g of AEROSOL 18, 10.2 g of TERGITOL NP-40 (70%), 108.83 g of methyl methacrylate, 136.04 g of styrene, and 95.23 g of 2-ethylhexyl acrylate was begun at 1.72 g/min. Five minutes after the first emulsion feed was begun, an initiator solution composed of 1.30 g sodium persulfate dissolved in 33.5 g of water was fed at 0.16 g/min. Five minutes after the monomer feed, an initiator solution of 0.4 g of sodium persulfate, and 0.4 g of sodium metabisulfite dissolved in 12 g of water was charged and heating continued for 30 minutes. The latex was then filtered through 100 mesh wire screen. Solids level, 41.7; amount of dried material (100 mesh screen), 3.05 g.

LATEX EXAMPLE 4

The following procedure describes the preparation of small structured core/shell acetoacetoxy-containing waterborne particles:

To a 3000 mL resin kettle equipped with a condenser, nitrogen purge, and subsurface feed tube were added 720.4 g of water, 39.2 g of HITENOL HS-20, 1.08 g of TERGITOL 15-S-40 (100%), 5.84 g of sodium carbonate, 25.52 g of methyl methacrylate, 35.2 g of styrene, 26.4 g of 2-ethylhexyl acrylate, and 0.88 g of trimethylolpropane triacrylate. A nitrogen purge was begun, then the contents of the reactor brought up to 80° C. at 400 rpm. After reaching 80° C., an initiator charge composed of 6.03 g of sodium persulfate dissolved in 34.84 g of water was added to the reactor. After 30 minutes, an emulsion feed composed of 158.4 g of water, 15.72 g of AEROSOL 18, 11.00 g of TERGITOL 15-S-40 (100%), 107.81 g of methyl methacrylate, 148.70 g of styrene, 111.53 g of 2-ethylhexyl acrylate, and 3.71 g of trimethylolpropane triacrylate was begun at 5.24 g/min. Five minutes after the first emulsion feed was begun, an initiator solution composed of 3.41 g of sodium persulfate dissolved in 87.2 g of water was fed at 0.336 g/min. Thirty minutes after the first emulsion feed was completed, the feed lines were wash with 60 g of water and a second emulsion feed composed of 138.4 g of water, 9.72 g of AEROSOL 18, 6.99 g of TERGITOL 15-S-40 (100%), 191.90 g of styrene, 43.25 g of methyl methacrylate, 143.93 g of 2-ethylhexyl acrylate, 95.95 g of acetoacetoxyethyl methacrylate, and 9.45 g of the sodium 2-acrylamido-2-methylpropanesulfonate (50% in water) was fed at 5.24 g/min. Five minutes after the last feed, initiator solutions composed of 2 g of isoascorbic acid in 16 g of water, and 5.05 g of a 0.5% ferrous sulfate water solution were charged to the reactor. A solution of 1.44 g of a 70% solution t-butylhydroperoxide in water was dissolved in 16 g of water and pumped in at 0.1 g per minute. After the feed of t-butylhydroperoxide, the latex was cooled and packaged. Solids level, 44.4; amount of dried material (100 mesh screen), 53 g; particle size (Dw), 70 nm; viscosity, 51 cps (Brookfield, 60 rpm); pH, 6.63.

LATEX EXAMPLE 5

The following procedure describes the preparation of small structured core/shell amine-containing waterborne particles:

The procedure for the preparation of the latex in this Example was similar to the latex preparation described in Example 4 except that 162.03 g of LUPASOL G35 poly(ethylenimine) (50% in water) was added in place of the ammonium hydroxide. The latex was then filtered through 100 mesh wire screen. Solids level, 45.8; pH, 10.4; amount of dried material (100 mesh screen), 1.24 g; particle size (Dw), 62 nm. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine).

LATEX EXAMPLE 6

The following procedure describes the preparation of small unstructured amine-containing waterborne particles:

To a 1000 mL resin kettle equipped with a condenser, nitrogen purge, and subsurface feed tube were added 174 g of water, 14.67 g of HITENOL HS-20, 0.39 g of sodium carbonate, and 9.26 g of AEROSOL 18. An emulsion feed composed of 167 g of water, 18.56 g of n-propyl alcohol, 12.07 g of TERGITOL 15-S-40 (70%), 64.83 g of methyl methacrylate, 138.5 g of styrene, 102.4 g 2-ethylhexyl acrylate, 34.11 g of acetoacetoxyethyl methacrylate, and 3.41 g of a 50% aqueous solution of sodium 2-acrylamido-2-methylpropane sulfonate was prepared, of which 17.47 g were added to the reactor. A nitrogen purge was begun, and the reactor contents brought up to 65° C. at 400 rpm. After reaching 65° C., an initiator charge composed of 1.27 g of sodium metabisulfite in 6.3 g of water, 0.25 g of sodium persulfate in 2.69 g of water, and 2.71 g of a 0.5% aqueous solution of iron(II) sulfate was added to the reactor. After 15 mins, the remainder of the emulsion feed was added to the reactor at a rate of 2.94 g/min. An initiator feed of 1.02 g of sodium persulfate and 1.20 g of sodium carbonate in 56.76 g of water was also begun at a rate of 0.32 g/min. Fifteen minutes after the monomer feed, a solution of 0.79 g of isoascrobic acid and 0.25 g of ammonium carbonate in 4.10 g of water was added slowly to the reactor. An initiator solution of 1.15 g of t-butyl hydroperoxide and 2.41 g of TERGITOL 15-S-40 (70%) in 6.49 g of water was then fed to the reactor over a period of 30 minutes. Fifteen minutes after this initiator feed, the emulsion was cooled, and 101.8 g of LUPASOL G35 polyethyleneimine (diluted to 40%) was added over 30 minutes. Following this addition, a solution of 26.04 g of ammonium bicarbonate in 112.5 g of water and 6.19 g of n-propyl alcohol was added to the emulsion over 30 mins. The latex was then filtered through a 100 mesh wire screen.

Ink Example 1

Latex Example 1 was reduced to 35% weight solids with water. A mass of 6.5 g of the diluted latex was placed in a 1 ounce wide-mouthed bottle. To this bottle was added 3.5 g of Flexivese Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 2

Latex. Example 2 was reduced to 35% weight solids with water. A mass of 6.5 g of the diluted latex was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 3

Latex Example 3 was reduced to 35% weight solids with water. A mass of 6.5 g of the diluted latex was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 4

Latex Examples 1 and 2 were each reduced to 35% weight solids with water. A blend of the two latexes was made that consists of 67% latex 1 and 33% latex 2 (by solids). A mass of 6.5 g of the diluted latex blend was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 5

Latex Examples 1 and 2 were each reduced to 35% weight solids with water. A blend of the two latexes was made that consists of 33% latex 1 and 67% latex 2 (by solids). A mass of 6.5 g of the diluted latex blend was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 6

Latex Examples 1 and 3 were each reduced to 35% weight solids with water. A blend of the two latexes was made that consists of 67% latex 1 and 33% latex 3 (by solids). A mass of 6.5 g of the diluted latex blend was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 7

Latex Examples 1 and 3 were each reduced to 35% weight solids with water. A blend of the two latexes was made that consists of 33% latex 1 and 67% latex 3 (by solids). A mass of 6.5 g of the diluted latex blend was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 8

Latex Examples 1, 2 and 3 were each reduced to 35% weight solids with water. A blend of the three latexes was made that consists of 34% latex 1, 33% latex 2 and 33% latex 3 (by solids). A mass of 6.5 g of the diluted latex blend was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 9

A mass of 1.2 g of ammonium bicarbonate was dissolved in 9.6 g of water. Using a laboratory stirrer the ammonium bicarbonate solution was added to 89.2 g of Latex Example 4. A mass of 65.7 g of the diluted and buffered latex was placed in a wide-mouthed jar. To this jar was added 34.3 g of Flexiverse Blue BHD-1121 pigment. The mixture was mixed with a laboratory stirrer for 10 minutes, then 1 hour on a roller, and then allowed to stand until the foam dissipated.

Ink Example 10

A mass of 1.2 g of ammonium bicarbonate was dissolved in 9.6 g of water. Using a laboratory stirrer the ammonium bicarbonate solution was added to a blend of 66.9 g of Latex Example 4 and 22.3 g of Latex Example 5. A mass of 65.7 g of the diluted and buffered latexes was placed in a wide-mouthed jar. To this jar was added 34.3 g of Flexiverse Blue BHD-1121 pigment. The mixture was mixed with a laboratory stirrer for 10 minutes, then 1 hour on a roller, and then allowed to stand until the foam dissipated.

Ink Example 11

A mass of 1.2 g of ammonium bicarbonate was dissolved in 9.6 g of water. Using a laboratory stirrer the ammonium bicarbonate solution was added to a blend of 44.6 g of Latex Example 4 and 44.6 g of Latex Example 5. A mass of 65.7 g of the diluted and buffered latexes was placed in a wide-mouthed jar. To this jar was added 34.3 g of Flexiverse Blue BHD-1121 pigment. The mixture was mixed with a laboratory stirrer for 10 minutes, then 1 hour on a roller, and then allowed to stand until the foam dissipated.

Ink Example 12

A mass of 1.2 g of ammonium bicarbonate was dissolved in 9.7 g of water. Using a laboratory stirrer the ammonium bicarbonate solution was added to a blend of 22.3 g of Latex Example 4 and 66.8 g of Latex Example 5. A mass of 65.7 g of the diluted and buffered latexes was placed in a wide-mouthed jar. To this jar was added 34.3 g of Flexiverse Blue BHD-1121 pigment. The mixture was mixed with a laboratory stirrer for 10 minutes, then 1 hour on a roller, and then allowed to stand until the foam dissipated.

Ink Example 13

A mass of 1.2 g of ammonium bicarbonate was dissolved in 9.7 g of water. Using a laboratory stirrer the ammonium bicarbonate solution was added to 89.1 g of Latex Example 5. A mass of 65.7 g of the diluted and buffered latexes was placed in a wide-mouthed jar. To this jar was added 34.3 g of Flexiverse Blue BHD-1121 pigment. The mixture was mixed with a laboratory stirrer for 10 minutes, then 1 hour on a roller, and then allowed to stand until the foam dissipated.

Ink Example 14

Latex Examples 1, 2 and 3 were each reduced to 35% weight solids with water. A blend of the three latexes was made that consists of 40% latex 1, 57% latex 2 and 3% latex 3 (by solids). A mass of 6.5 g of the diluted latex blend was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 15

Commercial latex Joncryl 2630[5] was reduced to 40% solids with water. A mass of 6.5 g of the diluted latex was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 16

A blend of 56.7% commercial latex Joncryl 2630 and 43.3% Latex Example 1 was reduced to 40% solids with water. A mass of 6.5 g of the diluted latex blend was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 17

A blend of 18.5% commercial latex Joncryl 2630 and 81.5% Latex Example 1 was reduced to 40% solids with water. A mass of 6.5 g of the diluted latex blend was placed in a 1 ounce wide-mouthed bottle. To this bottle was added 3.5 g of Flexiverse Blue BHD-1121 pigment. The mixture was shaken on a Brinkman Vibratory Mill at approximately 1800 cycles per min. for 5 min. The sample was then mixed on a roller for 30 min., and then allowed to stand until the foam dissipated.

Ink Example 18

A mass of 65.0 g of latex example 6 was placed in a wide-mouthed jar. To this jar was added 35.0 g of Flexiverse Blue BHD-1121. The mixture was mixed with a laboratory stirrer for 10 minutes, then 1 hour on a roller, and then allowed to stand until the foam dissipated.

INK APPLICATION AND TEST METHODS

The example inks were applied and tested according to the following procedures. The results are shown in Tables 1–3.

1. Application of the Ink and Cure Conditions

The inks were applied to oriented polypropylene(OPP) and to two high slip polyethylene films (Eastman 1925 polyethylene film and Amko polyethylene film) with a #3 RD rod using a K-Coat Automatic Coating Machine operated at a speed setting of 2.5. The prints were dried 5 in. from the blower face, 8 to 11.5 inches from the floor and 2–13 in. from the back wall of a VWR-1350 FD forced air oven. The prints were dried on a wooden frame which allowed accurate placement, and were dried perpendicular to the air flow. Drier time was 3 sec. from door closing to door opening. Drier temperature was 100° C. (±1° C.).

2. Performance Testing
    a. Time: Properties of interest for surface printing (wet rub, water spot, dry rub, adhesion) were tested 5 min. after drying. The prints were aged overnight before laminating and aged overnight before testing the lamination strength.
    b. Lamination Methods Both the top and bottom jaws of the Sentinel Heat Sealer were pre-heated to 300° C. The jaw pressure was set at 40 psi. The laminating substrate, a metallized film coated with a polyethylene blend[5], was cut so as to just completely cover the printed substrate. The two were placed with the PE coating facing the ink, then the film "sandwich" was put into a folded piece of paper. Using a marked section of the bars as a positioning guide, the paper was pushed all the way to the back of the heat sealer, It was then withdrawn about one eighth of an inch. The substrates were laminated at 300° C. for 3 sec. The laminated sample was removed from the heat sealer, and was quickly covered with an aluminum plate for a few seconds to dissipate the heat. The laminates were tested 24 hrs. after laminating with an Instron Tensile tester, Model TM, (Drive BX, Low BY=2) using a 5 lb. cell. Strength was averaged for the first 3 in of the recording chart where the angle of pull was an approximate "T" configuration. Four repeats were done per sample.
    c. Surface Property Testing 1. Water Resistance A drop of distilled water is placed on the dried surface of the film. The drop is allowed to stay for 5 min., then it is absorbed into a dry Shurwipe paper towel which is wrapped around the middle and index finger of the hand. With moderate pressure, the wetted towel is rubbed diagonally back and forth across the soaked area for 20 cycles. For both the soaked area (spot) and the perimeter, a rating between 0 and 5 is given, where 5 is no removal of the ink.

2. Dry Rub

A dry Shurwipe paper towel which is wrapped around the middle and index finger of the hand is rubbed with moderate pressure diagonally back and forth across the dried film for 20 cycles. A rating between 0 and 5 is given, where 5 is no removal of the ink.

3. Tape Adhesion

One end of a piece of Scotch Brand Tape, Type 600, is applied to the surface of the dried film. It is firmly rubbed to remove air bubbles and insure good contact. The tape is pulled quickly at about a 45 degree angle. A rating between 0 and 5 is given, where 5 is no removal of the ink.

TABLE 1

Lamination and surface printing performance results for inks 1 through 13. The inks were applied to OPP and PE, the OPP printer substrate was laminated to polyethylene coated metallized film. Bond strength of the laminate is shown. Surface printing properties on OPP and PE are also shown.

| Ink Example | Lamination Bond Strength (g/in) with OPP | Tape Adhesion OPP/PE | Water Spot OPP/PE | Water Perimeter OPP/PE | Dry Rub OPP/PE |
| --- | --- | --- | --- | --- | --- |
| 1 | Tear bond | 4.9/4.5 | 0/0 | 0/0 | 0/4.5 |
| 2 | 65 | 1.0/3.5 | 4.0/4.8 | 4.0/5.0 | 0/5.0 |
| 3 | <5 | 4.0/3.5 | 0.5/2.0 | 0.5/5.0 | 0/4.5 |
| 4 | Tear bond | 4.8/4.2 | 0/3.0 | 0/3.0 | 4.0/4.8 |
| 5 | 225 | 3.0/3.0 | 4.0/4.8 | 5.0/5.0 | 3.5/5.0 |
| 6 | Tear bond | 5.0/3.5 | 0/2.5 | 0/2.5 | 0/5.0 |
| 7 | 65 | 4.9/5.0 | 0.5/4.0 | 0.5/5.0 | 0/5.0 |
| 8 | 125 | 4.9/5.0 | 4.8/4.9 | 5.0/5.0 | 4.0/4.9 |
| 9 | 40 | 3.0/ND | 0.5/ND | 0/ND | 3.0/ND |
| 10 | 70 | 3.0/ND | 1.5/ND | 0.5/ND | 2.5/ND |
| 11 | 190 | 3.5/ND | 0/ND | 1.5/ND | 2.5/ND |
| 12 | 300 | 4.0/ND | 3.0/ND | 3.0/ND | 2.5/ND |
| 13 | Tear bond | 4.3/ND | 4.5/ND | 4.5/ND | 3.5/ND |
| 14 | Tear bond | 4.5/ND | 4.5/ND | 4.5/ND | 4.5/ND |
| 18 | Tear bond | 4.5/ND | 4.5/ND | 4.5/ND | 4.5/ND |

ND = Not determined

TABLE 2

Lamination and surface printing performance for example ink 14. Inks were applied to the substrates indicated in the table, then cured and tested by the methods described in the text.

| Substrate | Lamination Bond Strength (g/in) | Tape Adhesion | Water Spot | Wet Rub | Dry Rub |
|---|---|---|---|---|---|
| OPP | 150–300 | 4.5 | 4.5 | 4.9 | ND |
| Clear PE | ND | 3.4 | 4.5 | 5.0 | 4.9 |
| White PE | ND | 4.4 | 4.6 | 5.0 | 4.9 |

ND = Not determined

TABLE 3

Lamination performance for example inks 15 through 17. The inks were applied to OPP, then cured and laminated as described in the application and test method section in the text.

| Ink Example | Lamination Bond Strength (g/in) |
|---|---|
| 15 | <5 |
| 16 | 160 |
| 17 | 190 |
| 1 | Tear bond |

We claim:

1. A water-based ink composition comprising a pigment and a polymer latex selected from a polymeric (polyamino) enamine latex, and a mixture of a polymeric (polyamino) enamine latex and an acetoacetoxy-functional polymer latex, wherein the polymeric (polyamino) enamine is the reaction product of a surfactant-stabilized acetoacetoxy-functional polymer and a poly(alkylenimine).

2. An ink composition of claim 1, wherein the polymer latex is a polymeric (polyamino) enamine latex.

3. An ink composition of claim 2, wherein the surfactant-stabilized acetoacetoxy-functional polymer comprises about 1 to about 40 weight percent of a monomer of Formula (1):

$$R^1-CH=C(R^2)C(O)-X^1-X^2-X^3-C(O)-CH_2-C(O)-R^3 \quad (1)$$

where $R^1$ is a hydrogen or halogen; $R^2$ is a hydrogen, halogen, $C_1-C_6$ alkylthio group, or $C_1-C_6$ alkyl group; $R^3$ is a $C_1-C_6$ alkyl group; $X^1$ and $X^3$ are independently O, S, or a group of the formula —N(R')—, in which R' is a $C_1-C_6$ alkyl group; $X^2$ is a $C_1-C_{12}$ alkylene group or $C_3-C_{12}$ cycloalkylene group;

about 0.1 to about 5 weight percent of a non-self-polymerizing, surface-active vinyl monomer; and about 75 to about 90 weight percent of a non-acid vinyl monomer; and wherein the poly(alkylenimine) is poly (ethylenimine).

4. An ink composition of claim 3, wherein the monomer of Formula (1) is selected from acetoacetoxyethyl methacrylate, acetoacetoxyethyl acrylate, acetoacetoxy (methyl)ethyl acrylate, acetoacetoxypropyl acrylate, and acetoacetoxybutyl acrylate and the non-self-polymerizing, surface-active vinyl monomer is a polyoxyethylene alkyl phenyl ether of formula (3), (4), or (5):

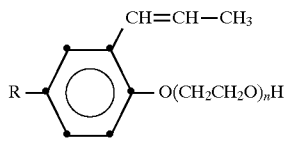

(3)

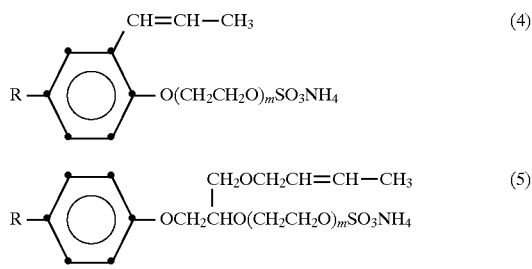

where R is nonyl or octyl, n ranges from 5 to 50, and m ranges from 15 to 40.

5. An ink composition comprising a latex of claim 1, further comprising at least one additive selected from a solvent, a leveling agent, a rheology agent, a coalescing aid, a pigment wetting agent, a dispersing agent, a surfactant, a wax, a defoaming agent, an antifoaming agent, a modifying polymer, and an additive to promote resolubility/rewet.

6. An ink composition of claim 5, wherein the ink composition is an adhesive laminating ink, an extrusion laminating ink, or a surface printing inks.

7. An ink composition of claim 2, further comprising at least one additive selected from a solvent, a leveling agent, a rheology agent, a coalescing aid, a pigment wetting agent, a dispersing agent, a surfactant, a wax, a defoaming agent, an antifoaming agent, a modifying polymer, and an additive to promote resolubility/rewet.

8. An ink composition of claim 7, wherein the ink composition is an adhesive laminating ink, an extrusion laminating ink, or a surface printing inks.

9. An ink composition of claim 1, further comprising an ammonium buffer and having a pH ranging from 9 to 10.

10. An ink composition of claim 2, further comprising an ammonium buffer and having a pH ranging from 9 to 10.

11. An ink composition of claim 1, wherein the polymer latex is a mixture of a polymeric (polyamino) enamine latex and an acetoacetoxy-functional polymer latex.

12. An ink composition of claim 11, wherein the surfactant-stabilized acetoacetoxy-functional polymer comprises about 1 to about 40 weight percent of a monomer of Formula (1):

$$R^1-CH=C(R^2)C(O)-X^1-X^2-X^3-C(O)-CH_2-C(O)-R^3 \quad (1)$$

where $R^1$ is a hydrogen or halogen; $R^2$ is a hydrogen, halogen, $C_1-C_6$ alkylthio group, or $C_1-C_6$ alkyl group; $R^3$ is a $C-C_6$ alkyl group; $X^1$ and $X^3$ are independently O, S, or a group of the formula —N(R')—, in which R' is a $C_1-C_6$ alkyl group; $X^2$ is a $C_1-C_{12}$ alkylene group or $C_3-C_{12}$ cycloalkylene group;

about 0.1 to about 5 weight percent of a non-self-polymerizing, surface-active vinyl monomer; and about 75 to about 90 weight percent of a non-acid vinyl monomer; and wherein the poly(alkylenimine) is poly (ethylenimine).

13. An ink composition of claim 12, wherein the monomer of Formula (1) is selected from acetoacetoxyethyl methacrylate, acetoacetoxyethyl acrylate, acetoacetoxy (methyl)ethyl acrylate, acetoacetoxypropyl acrylate, and acetoacetoxybutyl acrylate and the non-self-polymerizing, surface-active vinyl monomer is a polyoxyethylene alkyl phenyl ether of formula (3), (4), or (5):

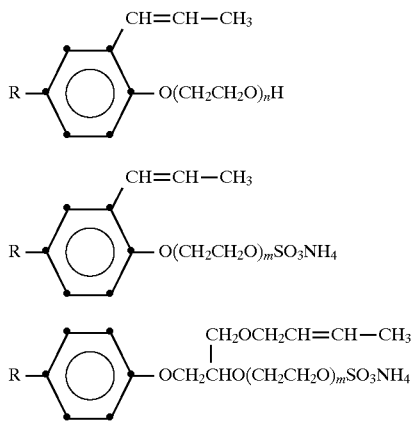

where R is nonyl or octyl, n ranges from 5 to 50, and m ranges from 15 to 40.

14. An ink composition of claim 11, further comprising at least one additive selected from a solvent, a leveling agent, a rheology agent, a coalescing aid, a pigment wetting agent, a dispersing agent, a surfactant, a wax, a defoaming agent, an antifoaming agent, a modifying polymer, and an additive to promote resolubility/rewet.

15. An ink composition of claim 11, wherein the ink composition is an adhesive laminating ink, an extrusion laminating ink, or a surface printing inks.

16. An ink composition of claim 11, further comprising an ammonium buffer and having a pH ranging from 9 to 10.

17. A method of printing comprising contacting a substrate with an ink composition of claim 1.

18. A method of printing of claim 17, wherein the substrate is a film or flexible package material.

19. A method of printing comprising contacting a substrate with an ink composition of claim 2.

20. A method of printing of claim 19, wherein the substrate is a film or flexible package material.

21. A method of printing comprising contacting a substrate with an ink composition of claim 11.

22. A method of printing of claim 21, wherein the substrate is a film or flexible package material.

* * * * *

UNITED STATES PATENT AND TRADEMARK OFFICE
CERTIFICATE OF CORRECTION

PATENT NO. : 5,891,950
DATED : April 6, 1999
INVENTOR(S) : COLLINS et al.

It is certified that error appears in the above-identified patent and that said Letters Patent is hereby corrected as shown below:

Column 20, Line 52, delete "C" and insert "$C_1$".

Signed and Sealed this

Thirty-first Day of August, 1999

Attest:

Q. TODD DICKINSON

*Attesting Officer*   *Acting Commissioner of Patents and Trademarks*